(12) United States Patent
Hirota (10) Patent No.: US 7,733,275 B2
(45) Date of Patent: Jun. 8, 2010

(54) INFORMATION APPARATUS AND OPERATION CONTROL METHOD THEREOF

(75) Inventor: Toshiyuki Hirota, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 896 days.

(21) Appl. No.: 11/525,342

(22) Filed: Sep. 21, 2006

(65) Prior Publication Data

US 2007/0200775 A1 Aug. 30, 2007

(30) Foreign Application Priority Data

Feb. 28, 2006 (JP) .............................. 2006-052043

(51) Int. Cl.
*H01Q 1/24* (2006.01)

(52) U.S. Cl. .................... 343/702; 455/575.1

(58) Field of Classification Search ................ 343/702; 455/557, 557.1, 557.7
See application file for complete search history.

(56) References Cited

U.S. PATENT DOCUMENTS

| 6,426,723 | B1 | 7/2002 | Smith et al. | |
| 2005/0128690 | A1 | 6/2005 | Chuang et al. | |
| 2007/0037619 | A1* | 2/2007 | Matsunaga et al. | 455/575.7 |
| 2007/0146210 | A1* | 6/2007 | Hilgers | 343/702 |
| 2007/0176835 | A1* | 8/2007 | Qi et al. | 343/702 |

FOREIGN PATENT DOCUMENTS

| JP | 11186841 | 7/1999 |
| JP | 11340845 | 12/1999 |
| JP | 2002-261665 | 9/2002 |
| JP | 2003-101623 | 4/2003 |
| JP | 2003-163956 | 6/2003 |
| JP | 2004-260592 | 9/2004 |
| JP | 2004-274633 | 9/2004 |
| JP | 2005-072734 | 3/2005 |
| JP | 2005-173524 | 6/2005 |
| JP | 2005-227899 | 8/2005 |
| JP | 2005-252539 | 9/2005 |

OTHER PUBLICATIONS

Office Action from the Chinese Counterpart application.

* cited by examiner

*Primary Examiner*—HoangAnh T Le
(74) *Attorney, Agent, or Firm*—Blakely, Sokoloff, Taylor & Zafman LLP (57) ABSTRACT

According to one embodiment, an information processing apparatus includes a display unit on which an antenna is mounted, an LCD provided on the display unit, and a controller which controls the amount of radiation of an electromagnetic wave from the antenna, when the antenna is located in a downward direction of an image displayed on the LCD.

20 Claims, 7 Drawing Sheets

INFORMATION APPARATUS AND OPERATION CONTROL METHOD THEREOF

CROSS-REFERENCE TO RELATED APPLICATIONS

This application is based upon and claims the benefit of priority from the prior Japanese Patent Application No. 2006-52043, filed Feb. 28, 2006, the entire contents of which are incorporated herein by reference.

BACKGROUND

1. Field

Embodiments of the present invention relate to an information apparatus having a display unit on which an antenna for radiating an electromagnetic wave and an operation control method thereof.

2. Description of the Related Art

Some types of information apparatus, such as a personal computer for example, include an antenna mounted on its display unit in order to radio-communicate with another apparatus. For example, U.S. Pat. No. 6,426,723 describes an example of a laptop computer having antennas mounted on the top portion and side portion of a display unit thereof.

In recent years, an information apparatus referred to as a "tablet PC" in which a display unit having a tablet on its display section is rotatably mounted on the main body through a hinge, has gained more public acceptance. Generally, this kind of information apparatus achieves a tablet usage condition called tablet mode by matching the back face of the display unit with the top face of the main body such that the tablet face is directed upward.

When a tablet PC on which an antenna for radiating an electromagnetic wave has been mounted is used, particularly when the tablet PC is used in the tablet usage condition, the antenna may be located near the user's body (such as the stomach). Since it is said that the electromagnetic wave may have an influence on a human body, there is a standard specified by law relating to electromagnetic waves.

BRIEF DESCRIPTION OF THE SEVERAL VIEWS OF THE DRAWING

FIG. 3a is an exemplary view showing a modification of antenna arrangement of FIG. 2a;

DETAILED DESCRIPTION

Hereinafter, embodiments of the present invention will be described with reference to the drawings.

Figure 1:
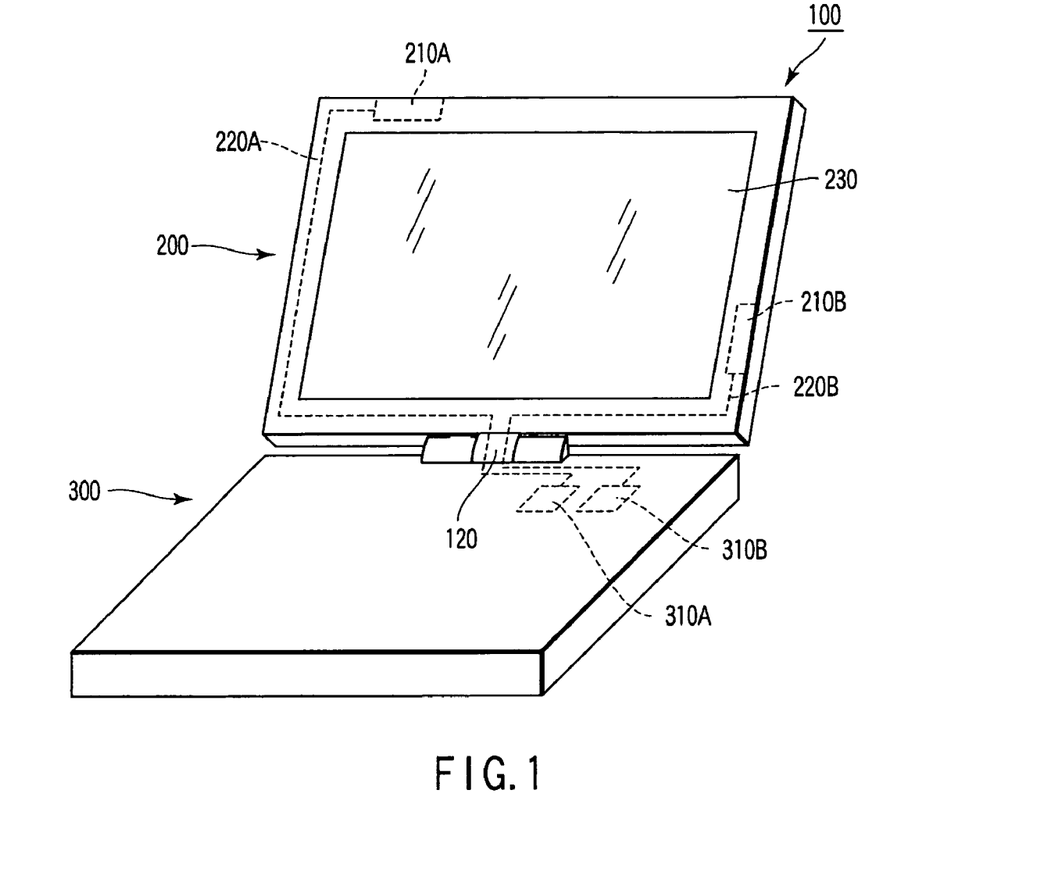
FIG. 1 is an exemplary perspective view showing the appearance of an information apparatus according to an embodiment of the present invention.

FIG. 1 is a perspective view showing an appearance of an information apparatus according to one embodiment of the present invention.

The information apparatus shown in FIG. 1 is a personal computer called tablet PC. The tablet PC 200 has a structure in which a display unit 200 having a tablet on a liquid crystal panel (display section) 230 is rotatably mounted to the main body through a hinge 120. The structure allows the display unit 200 to rotate freely around the hinge 120, so that the display unit 200 can be closed to the main body 300 with the liquid crystal panel (LCD) 230 facing outward. FIG. 1 shows a state in which the display unit 200 is opened from the main body 300 with the LCD 230 facing inward (corresponding to lap top usage condition called "lap top mode" (or "ordinary mode").

The display unit 200 includes antennas 210A, 210B for wireless LAN mounted thereon. These antennas 210A, 210B are installed at different angles by 90° so as to receive different polarized waves. The antenna 210A is provided on the top of the surface of the display unit 200 in a state in which the display unit 200 is opened and on the other hand, the antenna 210B is provided on the side face of the display unit 200. The antenna 210A is provided on the front face (side of the LCD 230) of the display unit 200, and the antenna 210B is provided on the back face of the display unit 200. Of course, the antenna 210A may be provided on the back of the display unit 200, and the antenna 210B may be provided on the front face of the display unit 200. Of the antennas 210A, 210B, any one is a transmitting/receiving antenna capable of receiving and transmitting (that is, radiating an electromagnetic wave) while the other is a receiving antenna intended for only receiving. The following description is made presuming that the antenna 210A is a transmitting/receiving antenna which radiates an electromagnetic wave.

On the other hand, the main body 300 includes wireless LAN controllers (modules) 310A, 310B. A power cable 220A is extended from the antenna 210A so as to pass near the left side of the display unit 200, and is connected to the wireless LAN controller 310A through a hinge 120. Likewise, the power cable 220B is extended downward from the antenna 210B and connected to the wireless LAN controller 310B through the hinge 120.

Figure 2A:
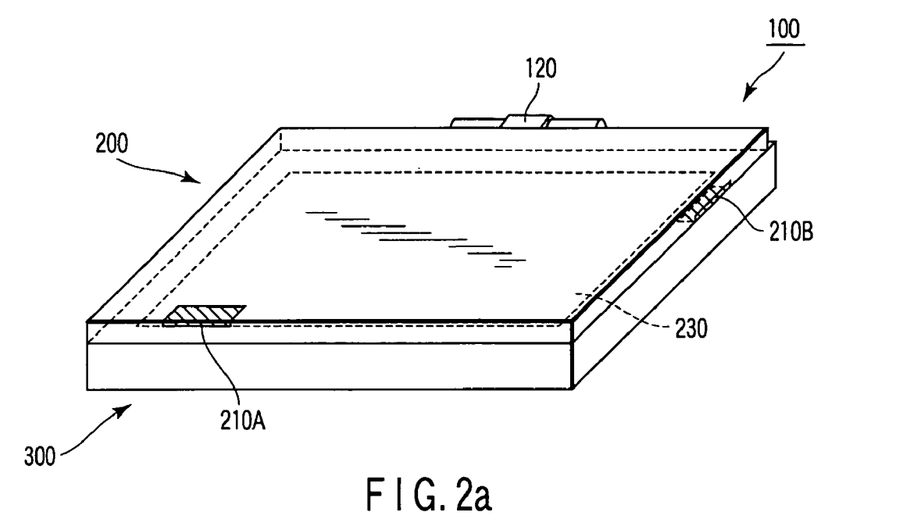
FIG. 2a is an exemplary view showing a state in which a display unit is closed to the main body side.
Figure 2B:
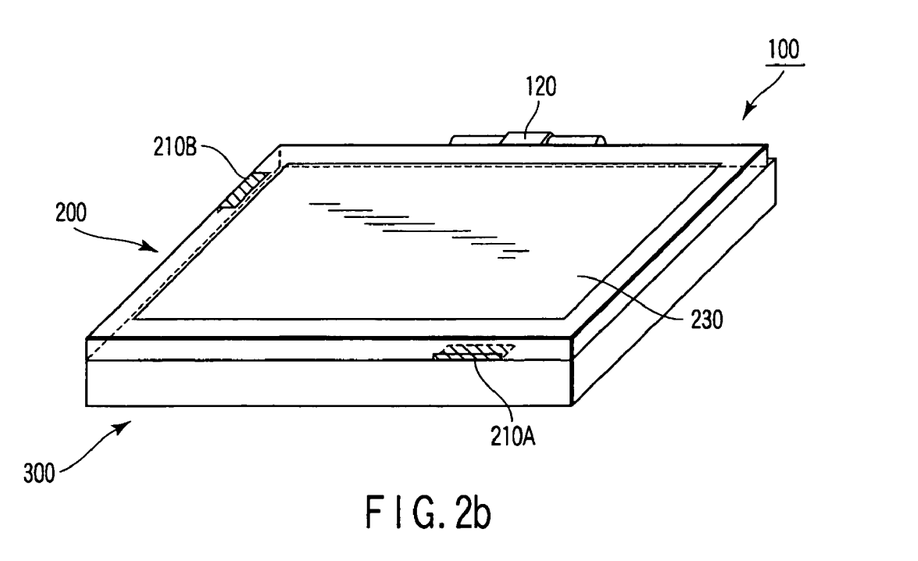
FIG. 2b is an exemplary view showing a state in which a display unit is closed to the side of a main body with a liquid crystal panel facing outward.

FIG. 2a shows a state in which the display unit 200 is closed to the side of the main body 300 with the LCD 230 facing inward. Representation of the power cables 220A, 220B is omitted. On the other hand, FIG. 2b shows a state in which the display unit 200 is closed to the side of the main body 300 with the LCD 230 facing outward, that is, such that the back face opposing the front face of the display unit 200 opposes the top face of the main body 300 (corresponding to a tablet use style called "tablet mode"). Representation of the power cables 220A, 220B and the like is omitted.

Figure 3A:
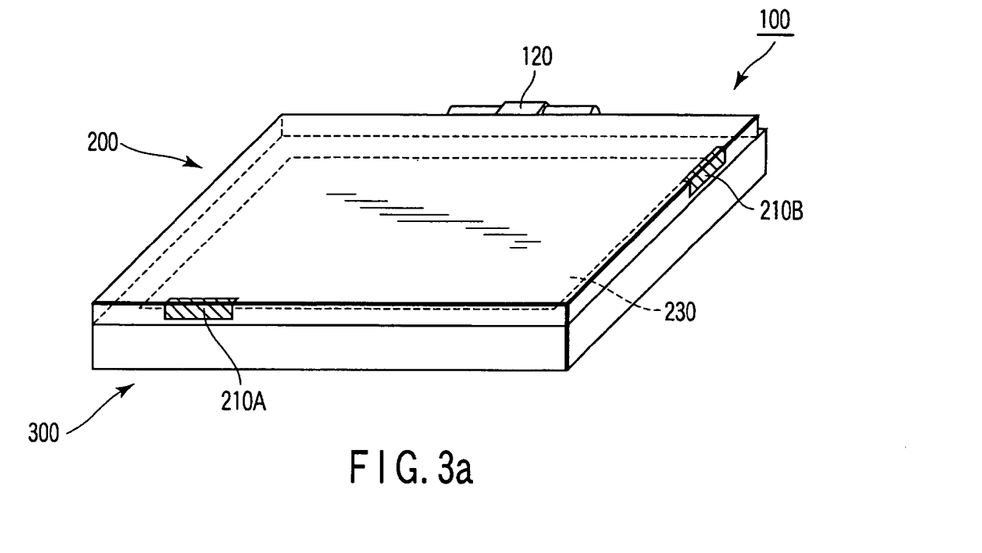
Figure 3B:
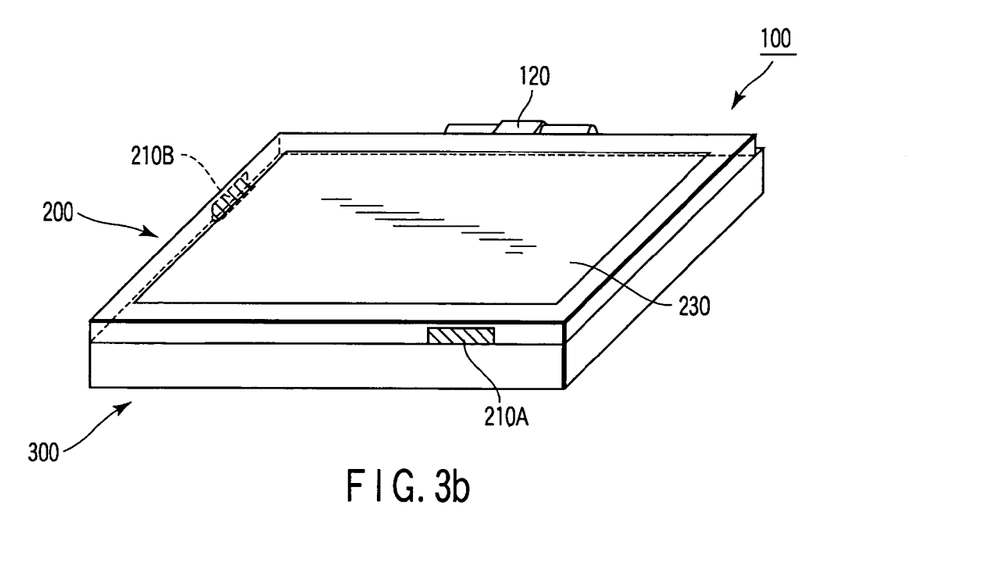
FIG. 3b is an exemplary view showing a modification of antenna arrangement of FIG. 2b.

The arrangement of the antennas 210A, 210B shown in FIGS. 2a and 2b may be changed as shown in FIGS. 3a and 3b.

Figure 4:
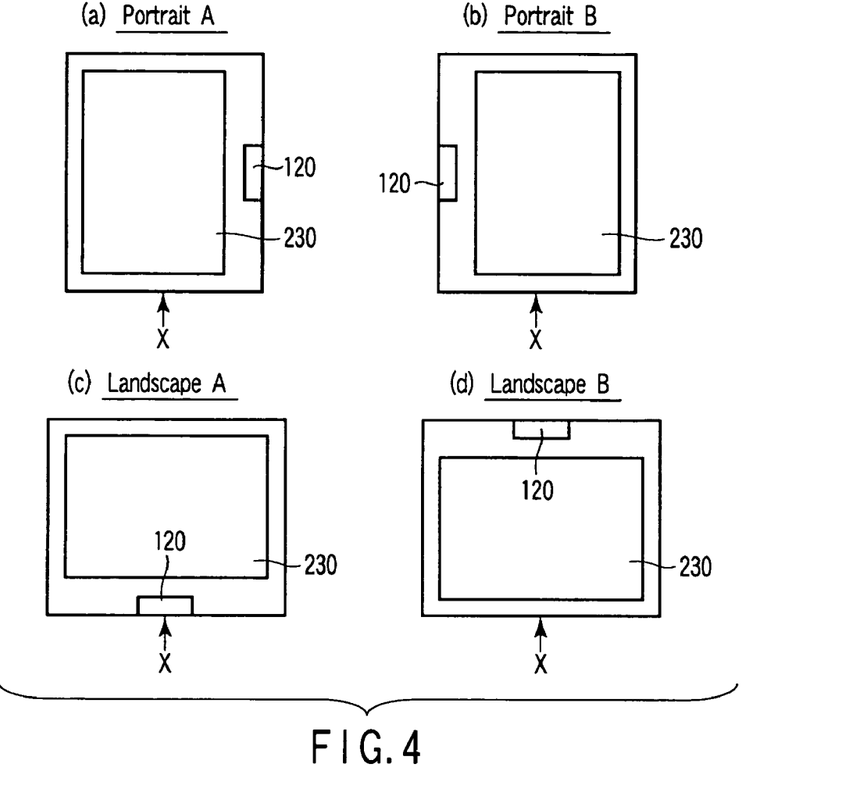
FIG. 4 is views for explaining the kinds of image display styles in a tablet mode.
Figure 5:
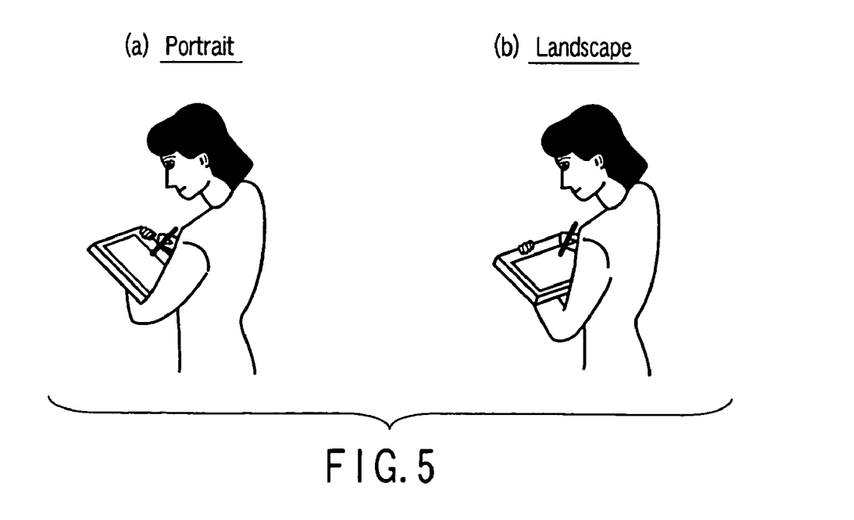
FIG. 5 is views for explaining a difference of the usage style depending on the kind of the image display style.

FIG. 4 is views for explaining the kinds of an image display style under the tablet mode. FIG. 5 is views for explaining a difference in usage style corresponding to the kind of the image display style.

As shown in FIG. 4, four kinds of the image display styles can be considered depending the direction of an image displayed on the LCD 230 under the tablet mode. The image display style is classified largely to "portrait" (vertically long) and "landscape" (laterally long).

In the example of the portrait A shown in FIG. 4 (a), the hinge 120 is located at the right side. On the other hand, in the example of the portrait B shown in FIG. 4 (b), the hinge 120 is located at the left side. FIG. 5 (a) shows an example in which user uses the tablet PC 100 in the portrait style.

In the example of the landscape A shown in FIG. 4 (c), the hinge 120 is located on the bottom. On the other hand, in the example of the landscape B shown in FIG. 4 (d), the hinge 120 is located on the top. FIG. 5 (b) shows an example in which a user uses the tablet PC 100 in the landscape style.

Figure 6:
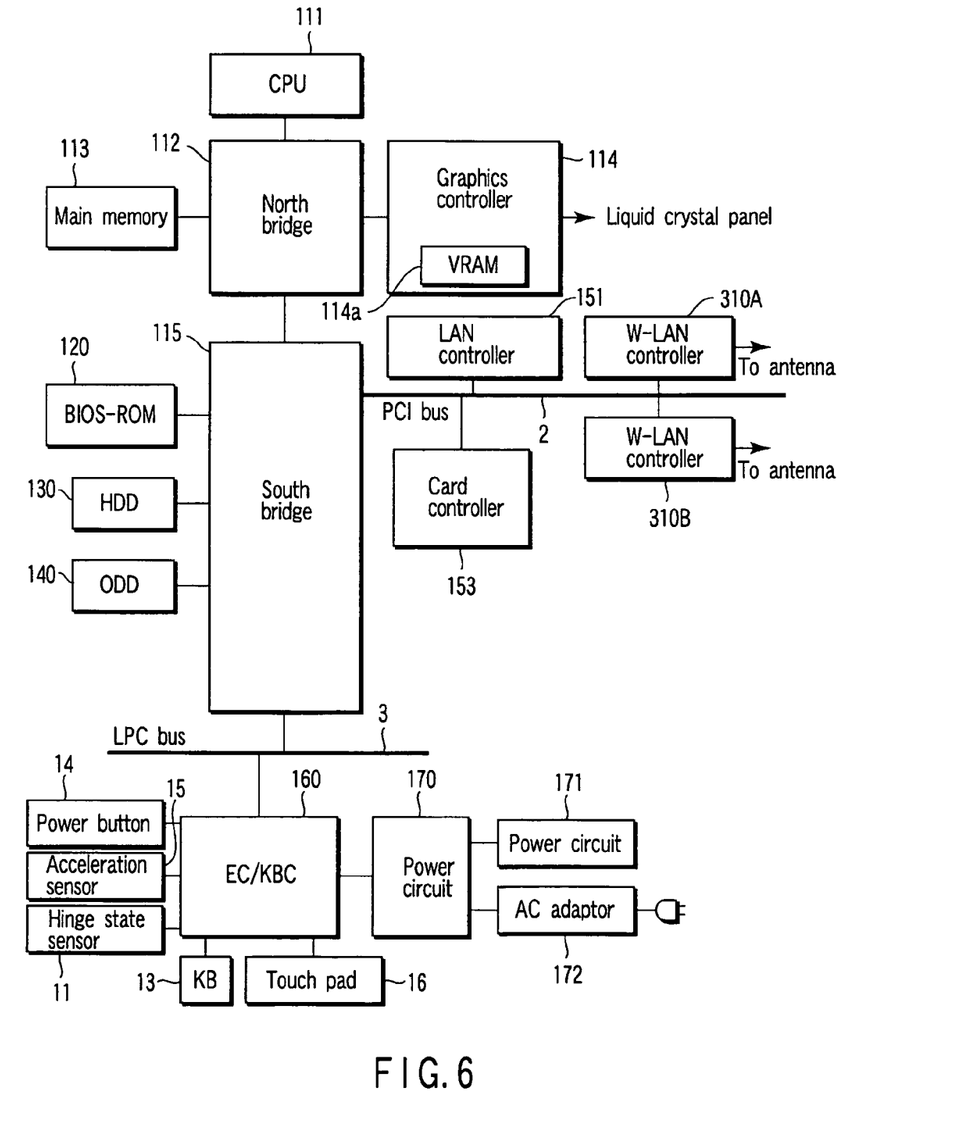
FIG. 6 is an exemplary block diagram showing an example of the system configuration of a tablet PC.

FIG. 6 is a block diagram showing an example of the system configuration of the tablet PC 100.

The main body 300 of the tablet PC 100 includes a CPU 111, a north bridge 112, a main memory 113, a graphics controller 114, and a south bridge 115. The main body 300 further includes a BIOS-ROM 120, a hard disk drive (HDD) 130, an optical disk drive (ODD) 140, a LAN controller 151, wireless LAN controllers 310A, 310B, a card controller 153, an embedded controller/keyboard controller IC (EC/KBC) 160, and a power circuit 170.

The CPU 111 is a processor for controlling the operation of the computer 10. The CPU 111 executes an operating system (OS) which is loaded from a boot device, for example, the HDD 130 to the main memory 113. The CPU 111 executes a variety of application programs. The CPU 111 executes a system basic input output system (BIOS) stored in the BIOS-ROM 120. The system BIOS is a program for executing hardware control and the like.

The north bridge 112 is a bridge device for connecting between the local bus of the CPU 111 and the south bridge 115. The north bridge 112 incorporates a memory controller for access-controlling the main memory 113. Further, the north bridge 112 has a function of executing communication with the graphics controller 114 through an accelerated graphics port (AGP).

The graphics controller 114 is a display controller for controlling the LCD 230 and the like. The graphic controller 114 has a video memory (VRAM) 114a, which generates a video signal for forming a display image to be displayed on the LCD 230 from display data written in the VRAM 114a.

The south bridge 115 controls access to the BIOS-ROM 120. The BIOS-ROM 120 is a nonvolatile memory rewritable like the flash ROM. The BIOS-ROM 120 stores a system BIOS. The south bridge 115 controls a disk drive (I/O device) such as the HDD 130 and ODD 140.

The south bridge 115 is connected to a peripheral component interconnect (PCI) bus 2 and a low pin count (LPC) bus 3. The south bridge 115 controls each device on the PCI bus 2 and LPC bus 3. The PCI bus 2 is used as a system bus.

The HDD 130 is a storage device for storing a variety of software and data. The HDD 130 writes/reads data with a head (magnetic head) to/from a magnetic recording medium (magnetic disk) rotated by a motor. An operating system (OS) is stored preliminarily in the HDD 130. The OS is loaded to the main memory 113 according to the system BIOS stored in the BIOS-ROM 120 and executed by the CPU 111.

The ODD 140 is a drive unit for rotating an optical recording medium (optical disk) such as a compact disk (CD) and a digital versatile disk (DVD) with a motor. The ODD 140 reads/writes data from/to an optical disk with a head (optical head).

The LAN controller 151, the wireless LAN controllers 310A, 310B and the card controller 153 are connected to the PCI bus 2. The LAN controller 151 is a network controller for connecting the main body 300 to LAN (wired LAN). The wireless LAN controller 310A is a network controller for connecting the main body 300 to the wireless LAN. The card controller 153 controls a card device such as a PC card and a secure digital (SD) card inserted into a card slot connected to the card controller 153.

The EC/KBC 160 is a microcomputer in which the embedded controller for power control and the keyboard controller for controlling the keyboard (KB) 13 and a touch pad 16 are integrated on a single chip. The EC/KBC 160 has a power control function which operates in cooperation with the power circuit 170 and turns ON the power of the computer 10 answering a user's operating of the power button switch 14. The EC/KBC 160 can notify the BIOS, driver or OS of information indicating various kinds of conditions by receiving each detection signal sent from an acceleration sensor 15 or a hinge state sensor 11.

The acceleration sensor 15 detects an acceleration given from outside relating to triaxial direction in space. The hinge state sensor 11 detects the state of the hinge 120 (that is, state of the display unit 200 relative to the main body 300).

The power circuit 170 generates a system power voltage to be applied to each element of the main body 300 using DC power supplied from a rechargeable battery 171 or through an AC adaptor 172 as a high voltage power source. The AC adaptor 172 converts AC power to DC power.

Figure 7:
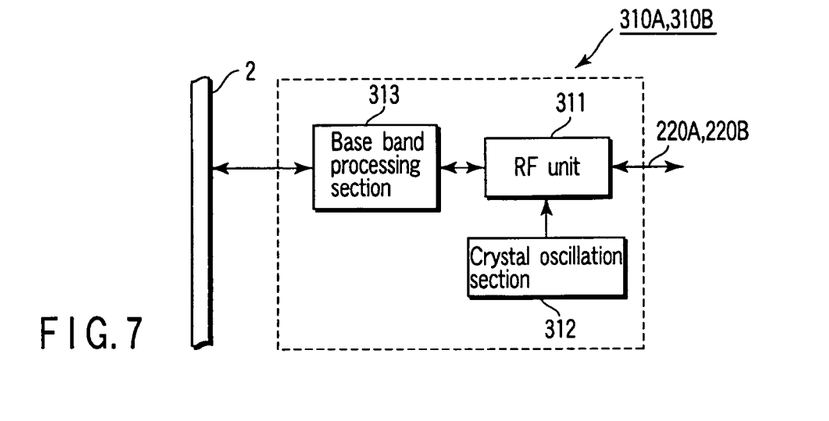
FIG. 7 is an exemplary block diagram showing an example of the configuration of a wireless LAN controller.

FIG. 7 is a block diagram showing an example of the configuration common to the wireless LAN controllers 310A, 310B. Here, only the wireless LAN controller 310A will be described.

The wireless LAN controller 310A comprises a radio frequency (RF) section 311, a crystal oscillation section 312, and a base band processing section 313.

The RF unit 311 converts a high frequency signal inputted from the antenna 210A through the power cable 220A to a low frequency signal based on an oscillation frequency of the crystal oscillation section 312 and outputs to the base band processing section 313. Further, a base band signal outputted from the base band processing section 313 is converted to a high frequency signal based on an oscillation frequency from the crystal oscillation section 312 and outputted to the antenna 210A through the power cable 220A.

The base band processing section 313 executes analog/digital conversion on the base band signal outputted from the RF unit 311 to change it to a digital signal which the CPU 111 can process and outputs the digital signal to the bus 2. Further, it executes digital/analog conversion on a digital signal inputted from the bus 2 to change it to a base band analog signal and outputs the base band analog signal to the RF unit 311.

Figure 8:
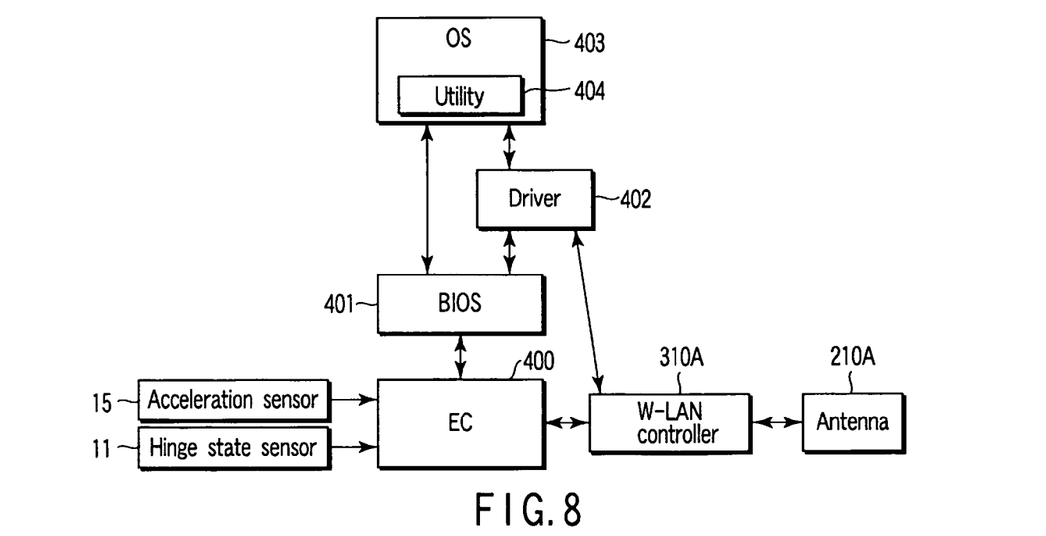
FIG. 8 is an exemplary block diagram showing an example of the functional configuration relating to inhibitory control of an electromagnetic wave radiated from a transmitting/receiving antenna.

FIG. 8 is a block diagram showing an example of the functional configuration relating to inhibitory control of an electromagnetic wave radiated from a transmitting/receiving antenna.

The EC 400 can transmit information of acceleration obtained from the acceleration sensor 15 and information of the hinge state sent from the hinge state sensor 11 to the OS 403 through the BIOS 401 or the like. In the meantime, this information may be so constructed that these pieces of information are sent to the OS 403 not through the EC 400.

The BIOS 401 can acquire information of acceleration and information of hinge state and notify those to the OS 403.

The driver 402 requests the EC 400 to stop/restart supply of power to the wireless LAN controller 310A through the BIOS 401 if an instruction about stop/restart of transmission output is dispatched from the OS 403. When an instruction about reduction/increase of the transmission output is dispatched from the OS 403, the driver 402 can decrease/increase the transmission output of the wireless LAN controller 310A. As a consequence, the output of amplification of the RF unit 331 of the wireless LAN controller 310A changes so that radiation of the electromagnetic wave from the antenna 210A may be suppressed or the suppression may be released.

The OS 403 can recognize the usage style (tablet mode, lap top mode or the like) of the tablet PC based on information of the hinge state obtained from the BIOS 40 or recognize the direction of a currently displayed image based on possessed information about display. Further, the OS 403 can recognize the motion of the tablet PC based on acquired information about acceleration and select the direction of a displayed image appropriately (that is, any one of the display styles shown in FIG. 4 can be selected). The OS 403 can acquire carrier information (information about provider or the like) through a predetermined communication module (3G module and the like). The information is transferred to a utility 404 and used to determine whether or not suppression (stop or reduction) of the transmission output of the wireless LAN controller 310A is required.

Figure 9:
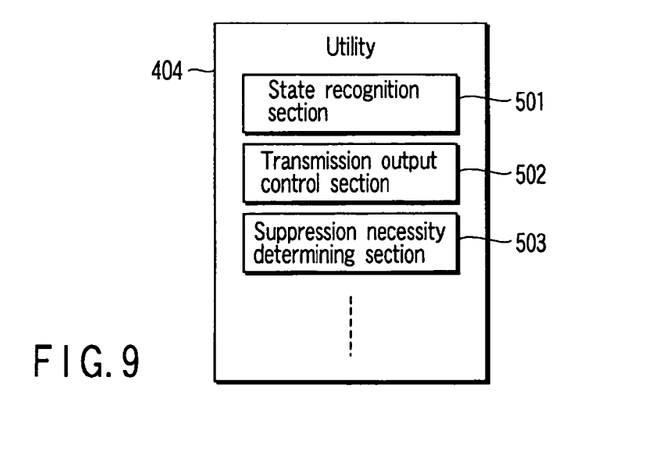
FIG. 9 is an exemplary block diagram showing an example of the functional configuration of utility.

The utility 404 includes various functions such as a state recognition section 501, a transmission output control section 502 and a suppression necessity determining section 503 as shown in FIG. 9. In the meantime, these functions do not need to be provided on the utility 404, and part of the functions may be borne by other software or hardware.

The state recognition section 501 can determine whether or not a predetermined state in which the tablet mode is formed, and the antenna 210A is located in a downward direction of an image displayed on the LCD 230 based on information of the hinge condition obtained from the BIOS 401 (or OS 403) and information about the direction of a display image obtained from the OS 403 or recognize this state. The antenna being located in a "downward direction" of an image means that the antenna is located between the user and the display section situated at the front face of the display unit.

The transmission output control section 502 can execute control (for example, control for reducing the amount of radiation, control for stopping the radiation, control for stopping transmission of the signal from the wireless LAN controller 310A to the antenna 210A) for suppressing radiation of the electromagnetic wave from the antenna 210A, when the above predetermined state is recognized.

The suppression necessity determining section 503 can determine whether or not suppression (stop or reduction) of the transmission output of the wireless LAN controller 310A is required by recognizing whether or not a provider indicated in acquired carrier information is mentioned in a predetermined list. The system may be constructed such that whether or not the control of the transmission output control section 502 is executed based on this determination result.

Figure 10:
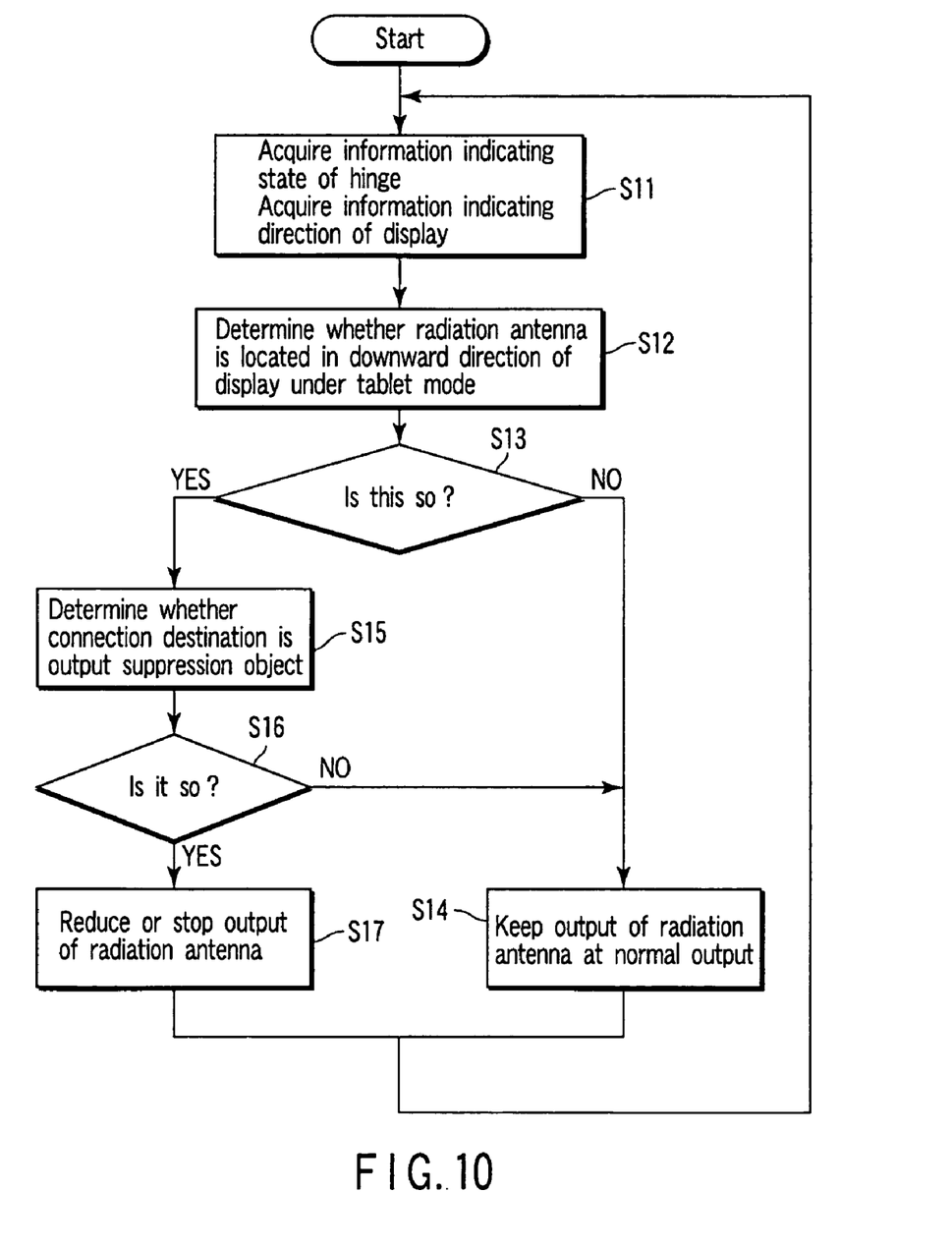
FIG. 10 is an exemplary flow chart showing an example of an operation relating to the inhibitory control of the electromagnetic wave radiated from the transmitting/receiving antenna.

Next, an example of an operation related to inhibitory control of the electromagnetic wave radiated from the transmitting/receiving antenna will be described with reference to FIG. 10.

The utility 404 acquires information of the hinge state from the BIOS 401 (or OS 403) and at the same time acquires information about the direction of a displayed image (block S11). Based on such information, the utility 404 determines whether or not the tablet mode is formed and the predetermined state in which the antenna 210A is located in the downward direction of an image displayed on the LCD 230 is established, namely below the display section of the display unit 200 (block S12). Unless the predetermined state is established (NO in block S13), the output of the antenna 210A is kept at a normal output (for example, maximum output) (or returned to the normal output)(block S14), and the processing from block S11 is repeated. On the other hand, if the predetermined condition is established (YES in block S13), it is confirmed whether or not the provider indicated in the acquired carrier information is mentioned in the predetermined list, whereby it is determined whether or not the suppression (stop or reduction) of the transmission output of the wireless LAN controller 310A is required (block S15). If the suppression is not required (NO in block S16), the output of the antenna 210A is kept at the normal output (for example, maximum output) (or returned to the normal output) (block S14), and the processing from block S11 is repeated. On the other hand, if the suppression is required (YES in block S16), control for reducing or stopping the output of the antenna 210A is executed to satisfy a standard specified by a law relating to electromagnetic waves (block S17), and the processing from block S11 is repeated.

According to this embodiment, in case of the tablet PC on which the antenna for radiating the electromagnetic wave has been mounted, the electromagnetic wave can be properly controlled to reduce a risk of influence on human body if the antenna approaches user's body (for example, stomach). Further, even if the direction of image display changes as the tablet PC moves, the inhibitory control of the radiated electromagnetic wave can be executed appropriately. Additionally, it is possible to determined whether or not the inhibitory control of the radiated electromagnetic wave is executed depending on the provider.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus comprising:
a display unit on which an antenna is mounted;
a display section provided on the display unit; and
control means for controlling an amount of radiation of an electromagnetic wave from the antenna when the antenna is located in a downward direction of an image displayed on the display section so that the antenna is located between a user and the display section displaying the image.

2. An information processing apparatus according to claim 1, wherein, when the antenna is located in the downward direction, the control means stops radiation of the electromagnetic wave from the antenna.

3. An information processing apparatus according to claim 1, wherein, when the antenna is located in the downward direction, the control means reduces the amount of radiation of the electromagnetic wave from the antenna.

4. An information processing apparatus according to claim 1, further comprising:
a radio module to transmit a signal to the antenna, wherein the control means includes means for stopping transmission of the signal from the radio module to the antenna.

5. An information processing apparatus according to claim 1, further comprising:
an acceleration sensor to detect an acceleration; and
switching means for switching the direction of an image displayed on the display section based on the acceleration detected by the acceleration sensor, wherein
when the antenna is located in a downward direction of the image switched by the switching means, the control means controls the amount of radiation of the electromagnetic wave from the antenna.

6. An information processing apparatus according to claim 1, further comprising:
determining means for determining whether or not control by the control means is carried out according to information of a provider who transmits an electromagnetic wave to be received by the antenna.

7. An information processing apparatus comprising:
a display unit on which an antenna that radiates an electromagnetic wave is mounted;
a display section provided on a front face of the display unit;
a main body rotatably mounted to the display unit through a hinge; and
control means for controlling an amount of radiation of the electromagnetic wave from the antenna when the antenna is located in a downward direction from an image displayed on the display section.

8. An information processing apparatus according to claim 7, wherein the control means controls the amount of radiation of the electromagnetic wave from the antenna when a back face opposing the front face of the display unit is located to oppose the top face of the main body while the antenna is located in the downward direction of the image displayed on the display section.

9. An information processing apparatus according to claim 7, wherein the antenna is disposed at the other side of the display unit to which the hinge is coupled.

10. An information processing apparatus according to claim 7, wherein, when the antenna is located in the downward direction of the image displayed on the display section, the control means stops radiation of the electromagnetic wave from the antenna.

11. An information processing apparatus according to claim 7, wherein, when the antenna is located in the downward direction of the image displayed on the display section, the control means reduces the amount of radiation of the electromagnetic wave from the antenna.

12. An information processing apparatus according to claim 7, further comprising:
a radio module to transmit a signal to the antenna, wherein the control means includes means for stopping transmission of the signal from the radio module to the antenna.

13. An information processing apparatus according to claim 7, wherein the control means controls the amount of radiation of the electromagnetic wave from the antenna when the antenna is located in the downward direction of the image displayed on the display section that occurs when the antenna is situated between the display section of the display unit and an user while the information processing apparatus is in use.

14. An information processing apparatus according to claim 7, further comprising:
an acceleration sensor to detect a tri-axial direction of the information processing apparatus in space; and
switching means for switching a direction of the image displayed on the display section based on information from the acceleration sensor, wherein
the control means controls the amount of radiation of the electromagnetic wave from the antenna based on information from the acceleration sensor.

15. An operation control method of an information processing apparatus in which a display section is provided on a display unit on which an antenna is mounted, the method comprising:
determining whether or not the antenna is located in a downward direction from an image displayed on the display section when the information processing apparatus is in use; and
when it is determined that the antenna is located in the downward direction from the image displayed on the display section, controlling the amount of radiation of an electromagnetic wave from the antenna.

16. An operation control method according to claim 15, wherein the radiation of an electromagnetic wave from the antenna is controlled to be stopped.

17. An operation control method according to claim 15, wherein the amount of radiation of an electromagnetic wave from the antenna is controlled to be reduced from a previous amount of radiation.

18. An operation control method according to claim 15, wherein the amount of radiation of an electromagnetic wave from the antenna is controlled by stopping transmission of a signal from a radio module included in the information processing apparatus to the antenna.

19. An operation control method according to claim 15, further comprising:
detecting an acceleration by an acceleration sensor included in the information processing apparatus; and
switching a direction of an image displayed on the display section based on the acceleration detected by the acceleration sensor.

20. An operation control method according to claim 15, further comprising:
determining whether or not the control for the amount of radiation of an electromagnetic wave from the antenna is carried out according to information of a provider who transmits an electromagnetic wave to be received by the antenna.

* * * * *